FIG. I

ROY B. DUKE, JR.
MILTON A. PERRY
HOWARD N. WRIGHT, JR.
INVENTORS

United States Patent Office 3,340,312
Patented Sept. 5, 1967

3,340,312
MANUFACTURE OF NEOPENTYL GLYCOL
AND ISOBUTANOL
Roy B. Duke, Jr., Smyrna, Ga., and Milton A. Perry and Howard N. Wright, Jr., Longview, Tex., assignors to Eastman Kodak Company, Rochester, N.Y., a corporation of New Jersey
Filed Oct. 21, 1964, Ser. No. 405,525
5 Claims. (Cl. 260—635)

This invention relates to a novel chemical process and more particularly to a novel process for the simultaneous production of neopentyl glycol and isobutanol.

Neopentyl glycol is a valuable chemical compound which has heretofore been prepared by various expensive and inefficient processes. We have now discovered a process for the simultaneous production of neopentyl glycol and isobutanol by which it is possible to manufacture neopentyl glycol and isobutanol in large quantities at a reasonable cost.

The process of our invention is made possible by our discovery of a novel combination of reaction conditions and purification procedures by which the efficient production of neopentyl glycol and isobutanol can be achieved. In particular, the process of our invention is made possible by our discovery that mixtures of hydroxypivaldehyde and isobutyraldehyde can be hydrogenated in the presence of copper-chromium oxide hydrogenation catalysts to give high yields of isobutanol and neopentyl glycol and by our discovery that mixtures of isobutyraldehyde and hydroxypivaldehyde suitable for hydrogenation in the presence of a copper-chromium oxide hydrogenation catalyst can be prepared by employing a stoichiometric excess of isobutyraldehyde in the aldol condensation of isobutyraldehyde and formaldehyde to hydroxypivaldehyde.

The process of our invention thus involves three chemical reactions which can be represented by the following equations:

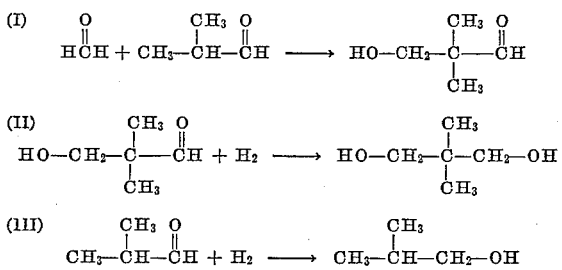

The process of our invention can be carried out in a batch or continuous manner. However, the process is preferably conducted in a continuous manner.

Figure 1:
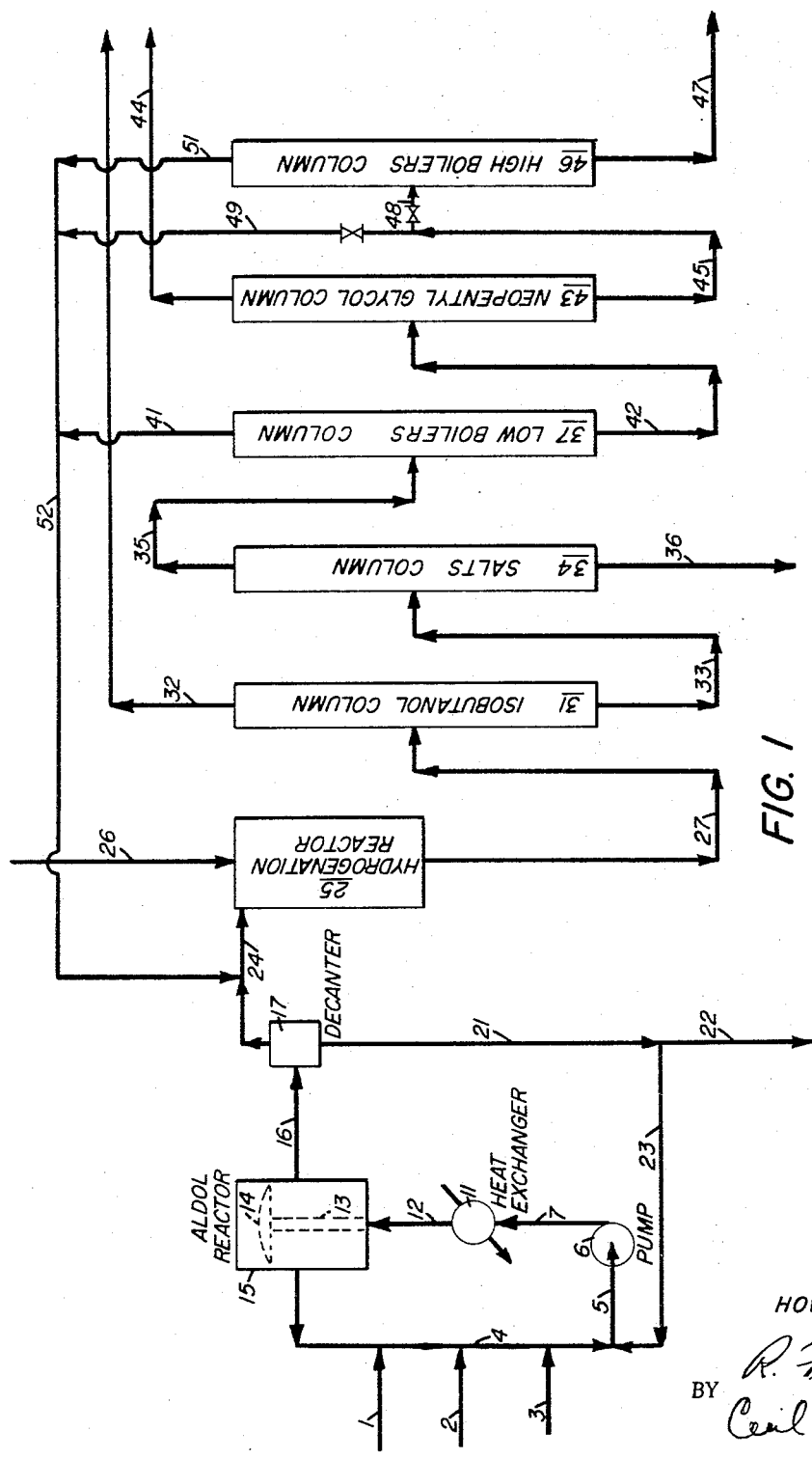

The following description of the process of our invention has reference to FIG. 1 which is a schematic flow diagram of one embodiment of our process.

Isobutyraldehyde is continuously fed into line 4 via line 1 and formaldehyde, e.g., an aqueous solution of formaldehyde, is continuously fed into line 4 via line 2. An aqueous alkali metal hydroxide aldol catalyst, e.g., a 0.25 percent solution of sodium hydroxide, is continuously fed into line 4 via line 3. The mixture of isobutyraldehyde, formaldehyde, and aqueous aldol catalyst is drawn through line 5 by pump 6 and forced through line 7. The mixture passes through heat exchanger 11 where the temperature of the mixture is adjusted to the desired reaction temperature, e.g., about 15° C. The mixture is then passed into aldol reactor 15 via line 12 and passes through conduit 13 from which it is directed against concave baffle plate 14. A portion of the mixture is withdrawn from aldol reactor 15 by line 4 for recirculation through line 5, pump 6, line 7, heat exchanger 11, line 12, conduit 13 while another portion of the mixture is withdrawn from reactor 15 by line 16 and passed to decanter 17 where the aqueous and organic phases are separated. The aqueous phase is withdrawn from decanter 17 by line 21 and discarded via line 22 or recycled to line 5 via line 23. The organic phase containing hydroxypivaldehyde and isobutyraldehyde is removed from decanter 17 and passed into hydrogenation reactor 25 by line 24. Hydrogen is introduced into hydrogenation reactor 25 via line 26 and is contacted with hydroxypivaldehyde and isobutyraldehyde in the presence of a copper-chromium oxide hydrogenation catalyst, e.g., a supported barium activated copper chromite catalyst. The hydrogenation product containing neopentyl glycol and isobutanol is removed from hydrogenation reactor 25 and passed into isobutanol column 31 via line 27. Isobutanol column 31 is operated at subatmospheric pressure and isobutanol and lower boiling components are removed overhead via line 32. The components of the hydrogenation product having a boiling point above that of isobutanol are removed from the bottom of column 31 and passed into salts column 34 via line 33. Salts column 34 is operated at subatmospheric pressure, e.g., a pressure of about 5 to about 200 mm. Hg, and any metal salts of organic acids (formed, for example, by the Cannizzaro reaction of aldehydes with the aldol catalyst) and any hydrogenation catalyst residues are removed from the bottom of salts column 34 and discarded via line 36. The overhead stream from salts column 34 is removed via line 35 and introduced into low boilers column 37.

Low boilers column 37 is operated so that the overhead stream which is removed via line 41 is composed of material having a boiling point below that of neopentyl glycol and the bottoms stream which is removed via line 42 is composed of neopentyl glycol and higher boiling material. The overhead stream is passed via line 41 into line 52 and recycled to hydrogenation reactor 25 by line 24. The bottoms stream is passed via line 42 into neopentyl glycol column 43 where it is separated into an overhead stream comprising substantially pure neopentyl glycol and a bottoms stream composed of material having a boiling point above that of neopentyl glycol. The substantially pure neopentyl glycol is removed overhead from neopentyl glycol column 43 via line 44 and the bottoms stream is removed via line 45 and recycled to hydrogenation reactor 25 via valved line 49, line 52 and line 24. Alternatively, the bottoms stream from neopentyl glycol column 43 is introduced into high boilers column 46 by line 45 and valved line 48. High boilers column 46 is preferably operated so that the bottoms stream which is removed via line 47 contains 2,2,4-trimethylpentane-1,3-diol and components having a boiling point above that of 2,2,4-trimethylpentane-1,3-diol and the overhead stream which is removed via line 51 and recirculated to hydrogenation reactor 25 via lines 52 and 24 is composed of material having a boiling point below that of 2,2,4-trimethylpentane-1,3-diol.

Figure 2:
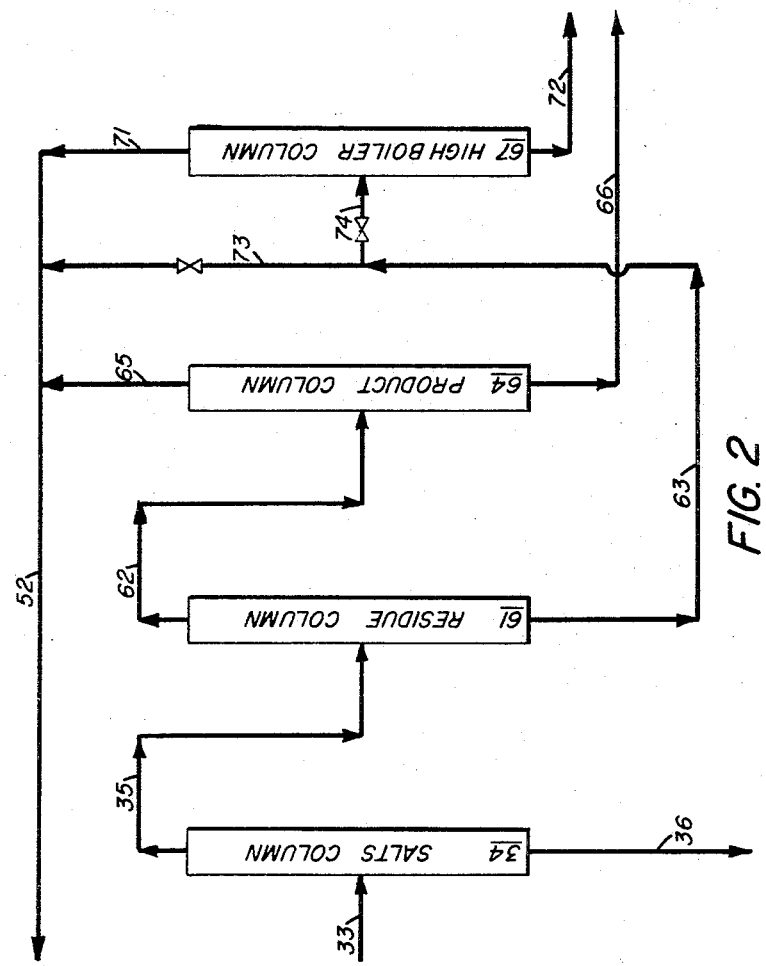

An alternate procedure for purifying the neopentyl glycol produced by the process of our invention is illustrated by the schematic flow diagram of FIG. 2. A fraction of the reaction product having a boiling point above that of isobutanol is obtained by removing isobutanol by fractional distillation from the product obtained by hydrogenating the product of the aldol condensation of isobutyraldehyde and formaldehyde, as illustrated in FIG. 1. This fraction, boiling above isobutanol, is then introduced into salts column 34 via line 33. Salts column 34 is operated at subatmospheric pressure, e.g., a pressure of about 5 to about 200 mm. Hg, and any metal salts of organic acids and any hydrogenation catalyst residues are removed from the bottom of salts column 34 and discarded via line 36.

The overhead from salts column 34 is removed and passed to residue column 61 via line 35.

Residue column 61 is operated so as to remove neopentyl glycol and all lower boiling components overhead and to remove all components having a boiling point above that of neopentyl glycol as a bottoms fraction. The overhead from residue column 61 containing neopentyl glycol and lower boiling components is removed and passed to product column 64 via line 62. Product column 64 is operated so that the bottoms fraction comprises substantially pure neopentyl glycol. The substantially pure neopentyl glycol is removed from product column 64 via line 66. The overhead from product column 64, having a boiling point below that of neopentyl glycol, is removed via line 65 and introduced into line 52 for recycle to the hydrogenation reactor (the hydrogenation reactor is shown as hydrogenation reactor 25 of FIG. 1).

The bottoms fraction from residue column 61, having a boiling point above that of neopentyl glycol, is removed via line 63 and introduced into line 52 for recycle to the hydrogenation reactor by valved line 73 or introduced into high boilers column 67 via valved line 74. High boilers column 67 is operated to produce a bottoms fraction comprising 2,2,4-trimethylpentane-1,3-diol and higher boiling components as a bottoms fraction which is removed via line 72 and an overhead fraction comprising components having a boiling point below that of 2,2,4-trimethylpentane-1,3-diol. The overhead fraction from high boilers column 67 is removed via line 71 and introduced into line 52 for recycle to the hydrogenation reactor.

In accordance with the process of our invention as hereinbefore set forth, we prepare a mixture of hydroxypivaldehyde and isobutyraldehyde by contacting formaldehyde with a stoichiometric excess of isobutyraldehyde in the presence of an aqueous alkali metal hydroxide aldol catalyst.

The aldol catalyst is an aqueous solution of an alkali metal hydroxide, e.g., lithium hydroxide, sodium hydroxide, potassium hydroxide, etc. The concentration of the alkali metal hydroxide in the aqueous phase should be from about 0.01 to about 1.0 percent. A preferred range of alkali metal hydroxide catalyst concentration in the aqueous phase is from about 0.05 to about 0.25 percent. The exact catalyst concentration chosen depends upon the reaction time. For reaction times of about one hour, an alkali metal hydroxide concentration of about 0.15 to about 0.25 percent is preferred, and for a reaction time of about two hours, an alkali metal hydroxide concentration of about 0.05 to about 0.15 percent is preferred.

In order to produce the hydroxypivaldehyde-isobutyraldehyde mixture that is required in the process of our invention, it is essential that a stoichiometric excess of isobutyraldehyde with respect to formaldehyde be employed in the aldol condensation. A preferred range of reactant ratios is from 2 to about 4 moles of isobutyraldehyde per mole of formaldehyde. Higher or lower ratios of isobutyraldehyde to formaldehyde can be employed and are often preferred.

The aldol condensation is carried out at a temperature of about 0° C. to about 25° C. and preferably about 5° C. to 20° C.

We have discovered that when the aldol condensation is carried out under the novel combination of reaction conditions hereinbefore set forth, i.e., excess isobutyraldehyde, alkali metal hydroxide catalyst concentration in the aqueous phase of about 0.01 to about 1.0 percent and reaction temperature of about 0° C. to about 25° C., the production of the desired hydroxypivaldehyde is unexpectedly enhanced and the production of undesirable by-products, for example, salts and isobutyraldol, is unexpectedly suppressed.

The hydroxypivaldehyde-isobutyraldehyde mixture can be separated from the aqueous phase containing the aldol catalyst by decanting. The separated aqueous phase can be recycled to the aldol reactor or can be discarded.

The organic phase containing hydroxypivaldehyde and isobutyraldehyde is hydrogenated in the presence of a copper-chromium oxide hydrogenation catalyst. The hydrogenation reaction can be conducted at a temperature of about 175° C. to about 220° C. and a hydrogen pressure of about 900 to about 6000 pounds per square inch, gage (hereinafter referred to as p.s.i.g.). The hydrogenation reaction is preferably carried out at a temperature of about 190° C. to about 200° C. and a hydrogen pressure of about 2100 to about 4600 p.s.i.g.

The copper-chromium oxide hydrogenation catalysts which are useful in the process of our invention are commercially available catalysts of known composition. These catalysts are often referred to as copper chromite catalysts though they do not necessarily contain the compound copper chromite. Among the useful catalysts are those disclosed in U.S. Patents 2,137,407; 2,091,800; 2,782,243; and 2,544,771 and in Adkins et al., J. Am. Chem. Soc. 53, 1091 (1931); J. Am. Chem. Soc., 53, 1095 (1931); J. Am. Chem. Soc., 54, 1145 (1932); Connor et al., J. Am. Chem. Soc., 54, 1138 (1932); Adkins et al., J. Am. Chem. Soc., 72, 2626 (1950); and Adkins, "Reactions of Hydrogen," Univ. of Wis. Press (1937).

The preferred copper-chromium oxide hydrogenation catalysts for use in the process of our invention contain, in addition to copper and chromium, one or more promoters such as barium, cadmium, magnesium or a rare earth metal. Among the preferred copper-chromium oxide hydrogenation catalysts are those available from the Harshaw Chemical Co., 1945 E. 97th St., Cleveland, Ohio, identified as Harshaw Cu 0402T–1/8 and Harshaw Cu 1107T–1/8.

The useful catalysts can contain binders such as sodium silicate and can be supported on carriers such as kieselgur, alumina, pumice, etc. When the hydrogenation reaction is carried out in a continuous manner, the catalysts are preferably employed in the form of pellets or other bodies of relatively high surface area that are readily separated from the products of hydrogenation.

The barium activated Harshaw catalysts listed above contain a silicate binder and have the following analyses, reported as weight percent CuO, $CrO_3$, and BaO.

|  | CuO | $CrO_3$ | BaO |
| --- | --- | --- | --- |
| Harshaw Cu 0402T-1/8 | 35 | 38 | 10 |
| Harshaw Cu 1107T-1/8 | 33 | 38 | 10 |

The material which is hydrogenated contains, in addition to isobutyraldehyde and hydroxypivaldehyde, various alcohols, diols, esters and diesters having a boiling point above or below that of neopentyl glycol. These alcohols, diols, esters and diesters are recovered in the purification steps of our process and are recycled to the hydrogenation reactor. The novel combination of hydrogenation reactor conditions, i.e., the use of a copper-chromium oxide hydrogenation catalysts at the temperatures and pressures discussed hereinbefore unexpectedly gives high yields of the desired products, e.g., neopentyl glycol and isobutanol, by the hydrogenation of isobutyraldehyde and hydroxypivaldehyde and by the simultaneous hydrogenolysis of the aforementioned recycled alcohols, diols, esters, and diesters.

The hydrogenation product mainly comprising neopentyl glycol and isobutanol together with small amounts of organic salts of the metal of the aldol catalyst, e.g., organic salts of sodium, is purified in a series of distillation steps which minimize the degradation of and enhance the recovery of the desired products.

The hydrogenation product is first fractionally distilled at subatmospheric pressure to produce an overhead fraction comprising mainly isobutanol and lower boiling components and, as a bottoms product, a neopentyl glycol rich fraction having a boiling point above that of isobutanol. The overhead fraction and the bottoms fraction are separately recovered and the bottoms fraction is subjected to further purification directed to the recovery of neopentyl glycol.

The neopentyl glycol rich bottoms fraction from the previously described fractional distillation step is again fractionated at subatmospheric pressure in order to remove any residual salts and any hydrogenation catalyst residues. The residual salts result from various chemical reactions, e.g., the Cannizzaro reaction, between the aldol catalyst and the various reactants and products of our process. The distillation to remove residual salts and catalyst residues is advantageously carried out at a pressure of about 5 to 200 mm. Hg and preferably about 50 to about 100 mm. Hg. The overhead product is a neopentyl glycol rich fraction substantially free of residual salts and catalyst residues and can be separated into a fraction having a boiling point below that of neopentyl glycol, a substantially pure neopentyl glycol fraction and a fraction having a boiling point above that of neopentyl glycol by fractionation in a train of at least two distillation columns as described hereinbefore. Preferably at least a portion of the fraction having a boiling point below that of neopentyl glycol and a portion of the fraction having a boiling point above that of neopentyl glycol are recycled to the hydrogenation zone within the hydrogenation reactor.

The following example illustrates the process of our invention.

Example

Neopentyl glycol and isobutanol were produced in a continuous process such as that shown in FIG. 1. A series of runs employing differing reaction conditions were made. An aqueous solution of sodium hydroxide was employed as the aldol catalyst. A barium activated copper-chromium oxide hydrogenation catalyst such as Harshaw Cu 0402T–1/8 or Harshaw Cu 1107T–1/8 was employed in each of the runs. In each of the runs, the bottoms fraction from neopentyl glycol, column 45 was fractionated in high boilers, column 46 into a 2,2,4-trimethylpentane-1,3-diol rich bottoms fraction and an overhead fraction having a boiling point of 210–225° C. The overhead fraction was recycled to the hydrogenation reactor. The results of each of the runs are summarized in the table.

taining 0.01 to about 1.0 percent by weight of an alkali metal hydroxide aldol condensation catalyst;
(b) separating a liquid organic phase containing hydroxypivaldehyde and isobutyraldehyde from said liquid aqueous phase;
(c) hydrogenating said liquid organic phase in a hydrogenation zone at a temperature of 175–220° C. and at elevated pressures in the presence of a copper-chromium oxide hydrogenation catalyst and obtaining a product containing neopentyl glycol and isobutanol; and
(d) separately recovering a neopentyl glycol rich fraction and an isobutanol rich fraction by subjecting said product to fractional distillation at subatmospheric pressure.

2. The process of claim 1 in which a neopentyl glycol rich fraction substantially free of residual salts and catalyst residues is obtained by subjecting the neopentyl glycol rich fraction of step (d) to further fractional distillation at a pressure of 5 to 200 mm. Hg.

3. The process of claim 2 further characterized in that the neopentyl glycol rich fraction substantially free of residual salts and catalyst residues is separated into a fraction having a boiling point below that of neopentyl glycol, a substantially pure neopentyl glycol fraction and a fraction having a boiling point above that of neopentyl glycol by fractionating said salt-free neopentyl glycol rich fraction in a train of at least two fractional distillation columns.

4. The process of claim 3 further characterized in that at least a portion of the fraction having a boiling point below that of neopentyl glycol and at least a portion of the fraction having a boiling point above that of neopentyl glycol are recycled to said hydrogenation zone.

5. The process for preparing neopentyl glycol which comprises:
(a) contacting formaldehyde with a stoichiometric excess of isobutyraldehyde at a temperature of about 0° C. to about 25° C. in the presence of a liquid aqueous phase containing about 0.01 to about 1.0 percent by weight of an alkali metal hydroxide;
(b) separating an organic phase containing hydroxypivaldehyde and isobutyraldehyde from said aqueous phase;

TABLE

| Run No. | Aldol Reactor ||||  Hydrogenation Reactor ||| Yield ||
|---|---|---|---|---|---|---|---|---|---|
| | Ratio Isobutyraldehyde to Formaldehyde | NaOH Concentrations, percent | Holdup, Minutes | Temperature, ° C. | Pressure, P.s.i.g. | Temperature, ° C. | Space Velocity, ml./hr./g. | Isobutanol, percent | Neopentylglycol, percent |
| 1 | 3.18 | 0.25±.02 | 56 | 12–15 | 3,300 | 195–205 | 0.5 | 92.0 | 87.3 |
| 2 | 3.16 | 0.26±.02 | 58 | 9.14 | 3,300 | 195–205 | 0.5 | 92.8 | 81.0 |
| 3 | 3.13 | 0.26±.01 | 58 | 9–14 | 3,300 | 195–205 | 0.5 | 86.7 | 82.6 |
| 4 | 2.95 | 0.26±.02 | 61 | 10–15 | 3,300 | 200–210 | 0.5 | 96.9 | 83.0 |
| 5 | 3.16 | 0.27±.02 | 57 | 9–14 | 3,300 | 200–210 | 0.5 | 90.0 | 81.3 |
| 6 | 3.53 | 0.19±.01 | 53 | 10–13 | 3,300 | 200–210 | 0.5 | 96.3 | 82.6 |
| 7 | 3.24 | 0.19±.02 | 55 | 12–14 | 3,300 | 200–210 | 0.5 | 92.8 | 80.1 |
| 8 | 3.19 | 0.19±.02 | 48 | 9–14 | 3,300 | 200–210 | 0.5 | 100 | 92.0 |

Although the invention has been described in considerable detail with particular reference to certain preferred embodiments thereof, variations and modifications can be effected within the spirit and scope of the invention as described hereinbefore and as defined in the appended claims.

We claim:
1. The process for preparing neopentyl glycol which comprises:
(a) contacting formaldehyde with a stoichiometric excess of isobutyraldehyde at a temperature of 0 to 25° C. in the presence of a liquid aqueous phase con-

(c) contacting said organic phase with hydrogen in a hydrogenation zone at a temperature of about 175° C. to about 220° C. and a hydrogen pressure of about 900 to about 6000 pounds per square inch in the presence of a copper-chromium oxide hydrogenation catalyst and obtaining a product containing neopentyl glycol and isobutanol;
(d) separately recovering a neopentyl glycol rich fraction and an isobutanol rich fraction by subjecting said product to fractional distillation at subatmospheric pressure;
(e) subjecting said neopentyl glycol rich fraction to further fractional distillation at a pressure of 5 to 200 mm. Hg and obtaining a neopentyl glycol rich fraction substantially free of residual salts and catalyst residues as overhead product;

(f) obtaining a fraction having a boiling point below that of neopentyl glycol, a substantially pure neopentyl glycol fraction and a fraction having a boiling point above that of neopentyl glycol by fractionating said overhead product in a train of at least two fractional distillation columns; and (g) recycling at least a portion of the fraction having a boiling point below that of neopentyl glycol and at least a portion of the fraction having a boiling point above that of neopentyl glycol to said hydrogenation zone.

References Cited

UNITED STATES PATENTS

| 2,137,407 | 11/1938 | Lazier | 260—638 |
|---|---|---|---|
| 2,400,724 | 5/1946 | Walker | 260—635 |
| 2,811,562 | 10/1957 | Hagemeyer | 260—602 |
| 2,818,443 | 12/1957 | Robeson | 260—635 |
| 2,895,996 | 7/1959 | Wright et al. | 260—635 |
| 3,102,150 | 8/1963 | Hunter et al. | 260—638 |
| 3,125,605 | 3/1964 | Buchner et al. | 260—635 |

FOREIGN PATENTS 309,200   3/1928   Great Britain.

LEON ZITVER, *Primary Examiner.*

G. A. MILWICK, J. E. EVANS, *Assistant Examiners.*